(12) United States Patent
Chang

(10) Patent No.: US 8,517,172 B1
(45) Date of Patent: Aug. 27, 2013

(54) PROTECTIVE HOUSING ASSEMBLY FOR ELECTRONIC DEVICES

(71) Applicant: Hsuan Chang, Taoyuan (TW)

(72) Inventor: Hsuan Chang, Taoyuan (TW)

(73) Assignee: Match U International Co., Ltd., Taoyuan City, Taoyuan County (TW)

( * ) Notice: Subject to any disclaimer, the term of this patent is extended or adjusted under 35 U.S.C. 154(b) by 0 days.

(21) Appl. No.: 13/632,441

(22) Filed: Oct. 1, 2012

(51) Int. Cl.
*B65D 85/30* (2006.01)

(52) U.S. Cl.
USPC .......................................... 206/320; 206/45.2

(58) Field of Classification Search
USPC ................. 206/45.2, 45.24, 45.28, 305, 320, 206/737, 751, 752, 762, 764, 765; 361/679.01; 455/90.3, 575.1, 575.8
See application file for complete search history.

(56) References Cited

U.S. PATENT DOCUMENTS

| | | | |
|---|---|---|---|
| 8,251,210 B2 * | 8/2012 | Schmidt et al. | 206/320 |
| 2008/0251512 A1 * | 10/2008 | Griffin et al. | 220/4.02 |
| 2010/0072334 A1 * | 3/2010 | Le Gette et al. | 248/176.3 |
| 2010/0096284 A1 * | 4/2010 | Bau | 206/320 |
| 2011/0259664 A1 * | 10/2011 | Freeman | 206/320 |
| 2011/0297566 A1 * | 12/2011 | Gallagher et al. | 206/320 |

\* cited by examiner

Primary Examiner — Luan K Bui
(74) Attorney, Agent, or Firm — Egbert Law Offices, PLLC

(57) ABSTRACT

The present invention provides a protective housing assembly of electronic devices, of which said protective housing assembly is attached onto the back of existing electronic device; it mainly comprising: a main body and a secondary body; of which the secondary body is arranged removably into the holding space formed by the main body; With the design of the removable structure formed by the main and secondary bodies, this enables easier replacement and assembly of the main and secondary bodies; and when the user intends to remove the protective housing assembly, only the main body or the secondary body is required to be pulled so that the first or second limiting flange is disengaged from the electronic device, thus avoiding surface damage and scratching of the electronic device; furthermore, the main and secondary bodies could be configured with different colors or patterns, permitting the users to assemble or replace them where necessary; and the disassembled main body or secondary body could be repetitively used or combined, thereby improving substantially the convenience and applicability of the electronic device while avoiding its damage or scratching.

8 Claims, 7 Drawing Sheets

PROTECTIVE HOUSING ASSEMBLY FOR ELECTRONIC DEVICES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a protective housing assembly, and more particularly to an innovative one which is attached onto the back of the electronic devices for convenient removal, replacement or assembly.

2. Description of Related Art Including Information Disclosed Under 37 CFR 1.97 and 37 CFR 1.98

With the swift development of electronic technologies, a variety of portable electronic products with various functions, such as smartphones, PDAs, tablet computers and electronic players, are universally used in the everyday life. In this backdrop, various protective housings that can be attached onto such electronic devices are launched into the market. Given the unique features of the protective housings in patients and colors, such electronic products are favorably enjoyed by young customers.

However, such common protective housings are almost prefabricated in a way that it is structurally formed by housing plates and a peripheral wall extended downwards from the housing plates, so a holding space is formed within the housing plates and peripheral wall to accommodate the electronic products. However, when the protective housing is installed onto the electronic product, the peripheral wall is covered tightly onto the electronic product for limitation. Hence, a larger force will be often applied to the protective housing for removing the protective housing and then the electronic product, leading to inconvenient disassembly and possible scratching and damage of the electronic product. In addition, as the conventional protective housing is limited to a prefabricated structure, the patterns or colors are directly formed on the housing plates and peripheral wall of the protective housing. If the user intends to change to another pattern or color, another protective housing has to be purchased, making it hard to meet the fast-changing user demands. In fact, the currently available protective housing is nothing but an auxiliary part of the electronic device, so a great concern will be raised to develop a more practical protective housing structure for the benefit of the users and industrial operators.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

Based on the removable structure of "a protective housing assembly of electronic device" that is mainly comprised of the main and secondary bodies, this allows for easier replacement and mating of the main and secondary bodies. Moreover, the main and secondary bodies are separately limited at both sides and corners of the electronic device, only the main or the secondary body is required to be pulled so that the first or second limiting flange is disengaged from the electronic device, when the user intends to remove the protective housing assembly. As compared with prior art wherein the protective housing covers tightly the electronic product by its lateral wall, the present invention allows to disengage separately the main and secondary bodies from the electronic device, making it more convenient for disassembly to avoid any surface damage and scratching of the electronic devices during the disassembly process. Besides, the main and secondary bodies could be configured with different colors or patterns, permitting the users to assemble or replace them where necessary. Further, the disassembled main body or secondary body could be repetitively used or combined, thereby improving substantially the convenience and applicability of the electronic device while avoiding its damage or scratching.

Based on the technical characteristics wherein at least a snap lock is arranged at a preset location on the recess plate portion of the main body, and at least a lateral face of the secondary body is provided with a slot, the user could firstly align the slot with the snap lock, and then fix the slot into the snap lock by pulling upwards or pressing downwards, so the secondary body is used as a support, and the user could, where applicable, engage the slot into the snap lock, enabling to visualize the electronic device at an optimal angle without need of holding it manually.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
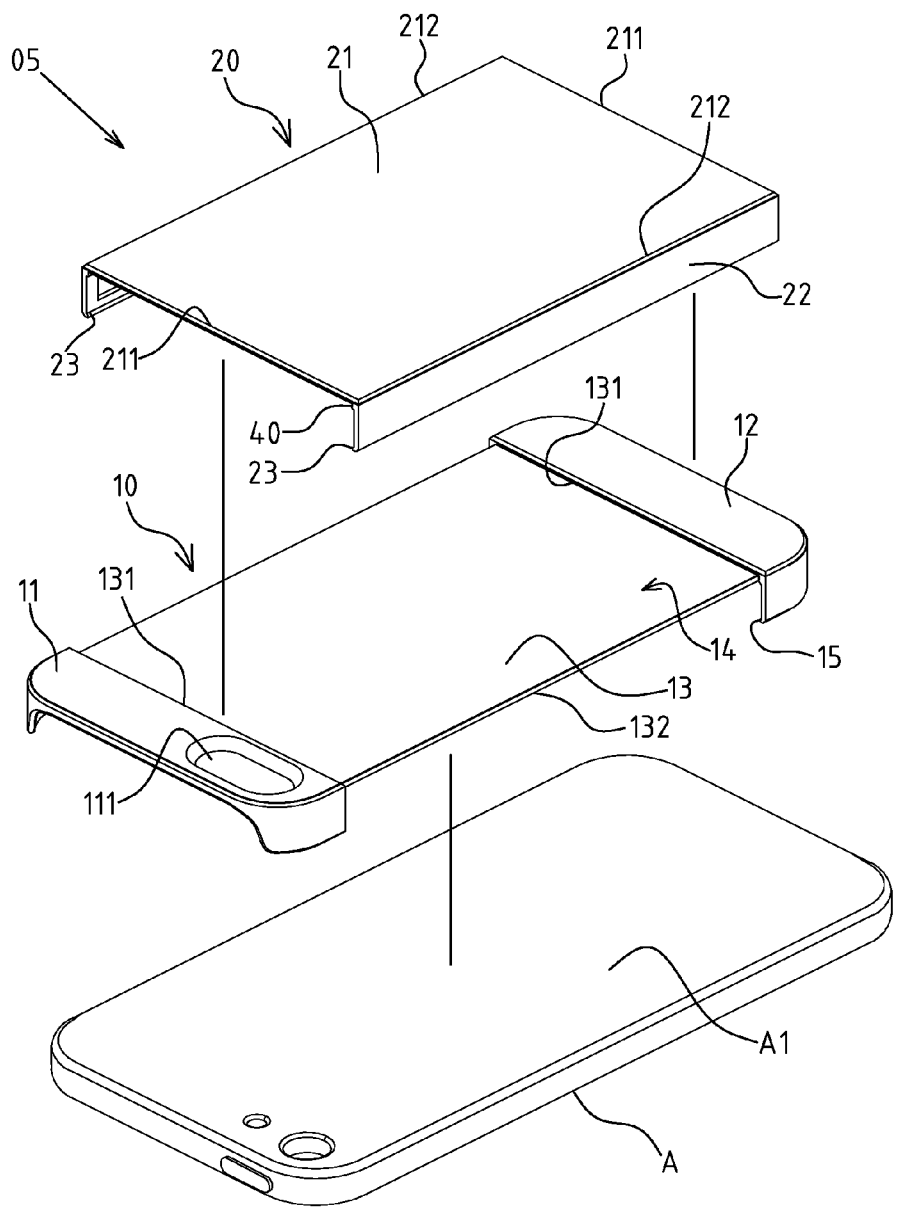
FIG. 1 is an exploded perspective view of the present invention wherein the protective housing assembly is mounted onto the electronic device.
Figure 2:
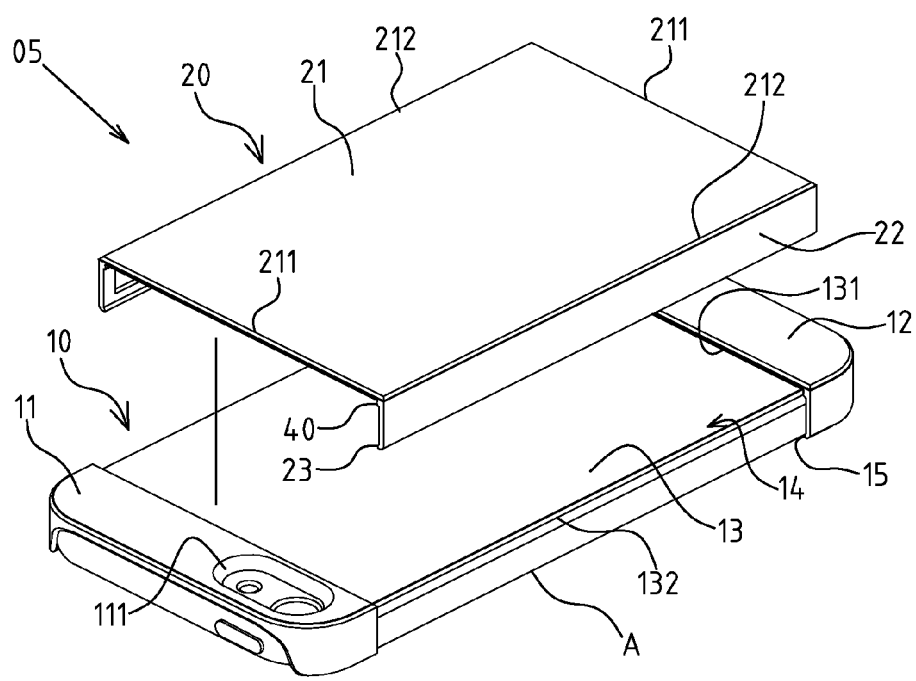
FIG. 2 is another exploded perspective view of the present invention wherein the protective housing assembly is mounted onto the electronic device.
Figure 4:
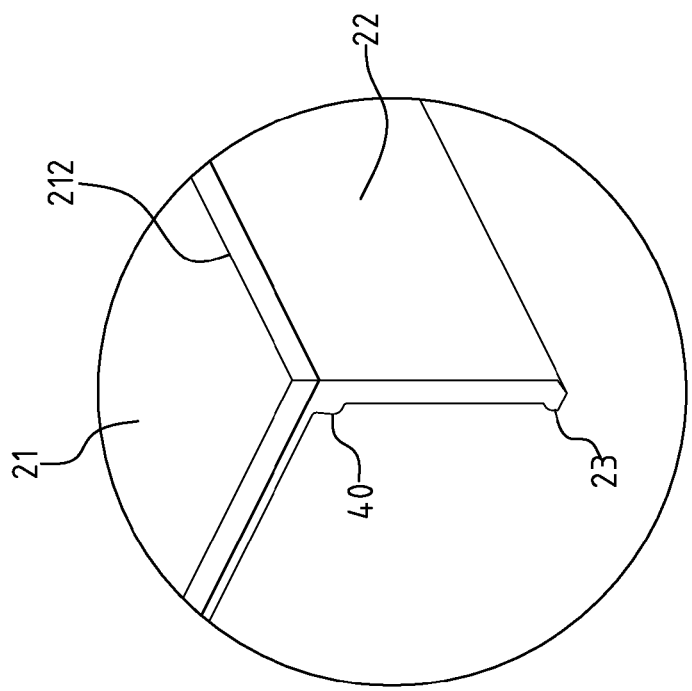
FIG. 4 is a partially enlarged view of the secondary body of the present invention.

FIGS. 1-5 depict the preferred embodiments of a protective housing assembly of electronic devices of the present invention, which, however, are provided for only explanatory objective for patent claims. Said protective housing assembly 05 is attached onto the back A1 of existing electronic device A. The electronic device A of the present invention refers to any of mobile phone, portable multi-media player or tablet computer, etc.

The protective housing assembly 05 comprises a main body 10, designed into a predefined pattern, and including a front frame body 11, provided with an opening through-hole 111 at its preset location. The through-hole 111 is aligned with the camera lens or audio port, etc, preset on the electronic device A. A rear frame body 12 is set at the other side of the front frame body 11. The front and rear frame bodies 11, 12 could cover the corners and sides of the back A1 of the electronic device A. A recess plate portion 13 is arranged transversely between the front and rear frame bodies 11, 12. Moreover, the front and rear frame bodies 11, 12 of height difference are recessed to form a holding space 14. Of which, two limited sides 131 are formed at the joint of the front/rear frame bodies 11, 12 and the recess plate portion 13, while two open sides 132 are formed at left and right sides of the recess plate portion 13. A first limiting flange 15 is formed interiorly at bottom of the front and rear frame bodies 11, 12, so that when the main body 10 is incorporated onto the electronic device A, the first limiting flange 15 could limit the corners and sides of the electronic device A.

The protective housing assembly 05 further includes a secondary body 20, arranged removablely into the holding space 14 formed by the main body 10. The secondary body 20 includes a top surface 21 provided with longitudinal sides 211 and lateral sides 212. The top surface 21 is configured to mate with the recess plate portion 13 of the main body 10. Of which, the longitudinal sides 211 are of straight and curved patterns, but not limited to these. Two lateral faces 22 are extended downwards from the lateral sides 212 of the top surface 21. When the secondary body 20 is mounted into the holding space 14 of the main body 10, the lateral faces 22 are aligned with the open sides 132 of the recess plate portion 13, while the longitudinal sides 211 of the top surface 21 are aligned with the limited sides 131 of the recess plate portion 13, enabling limitation of the mounted secondary body 20. A second limiting flange 23 is formed interiorly at bottom of two lateral faces 22 of the secondary body 20. When the secondary body 20 is mounted into the holding space 14 of the main body 10, the second limiting flange 23 could limit two sides of the electronic device A.

Of which, both the main body 10 and the secondary body 20 of the protective housing assembly 05 are made of any of metal or plastic, or any of them is made of metal and the other made of plastic.

Figure 6:
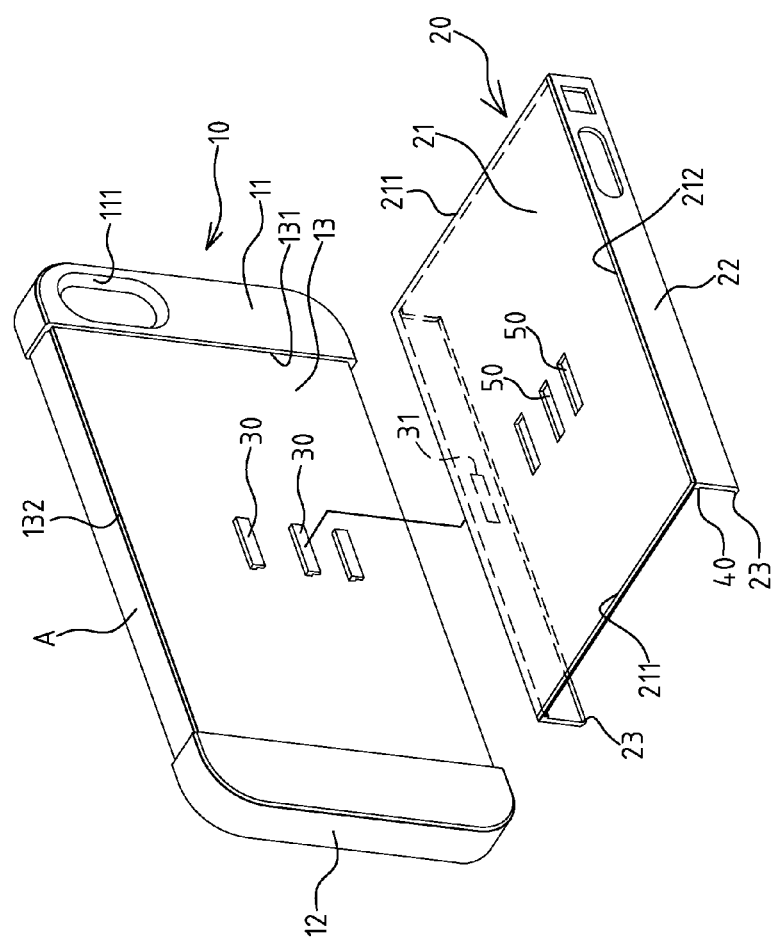
FIG. 6 is an exploded perspective view of another preferred embodiment of the present invention.
Figure 7:
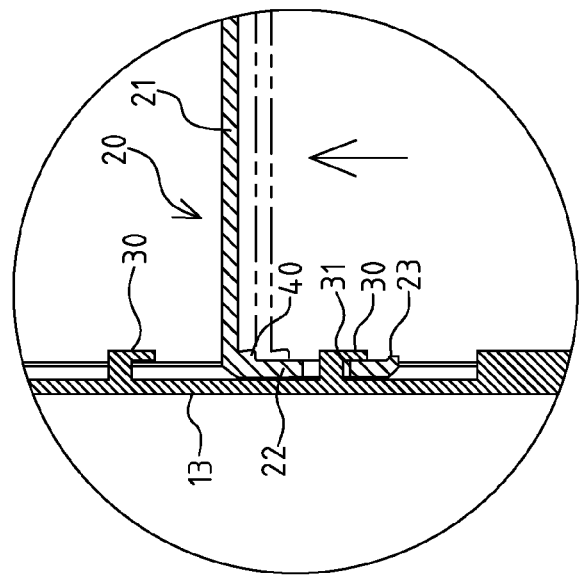
FIG. 7 is an application state view of the present invention wherein the slot is mated with the snap lock.
Figure 7:
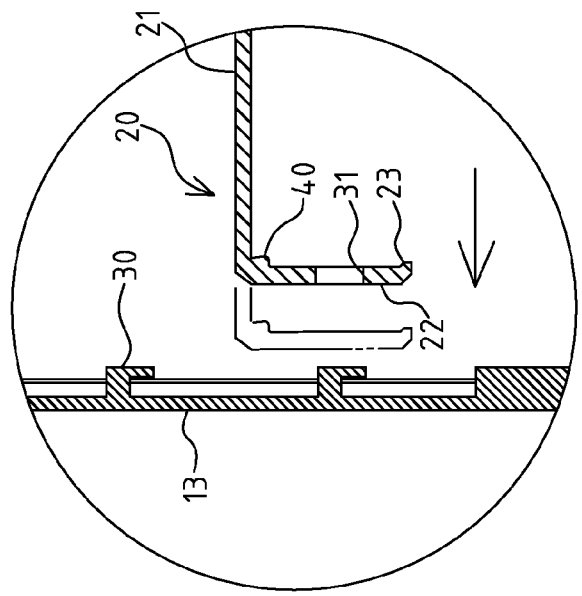
Figure 8:
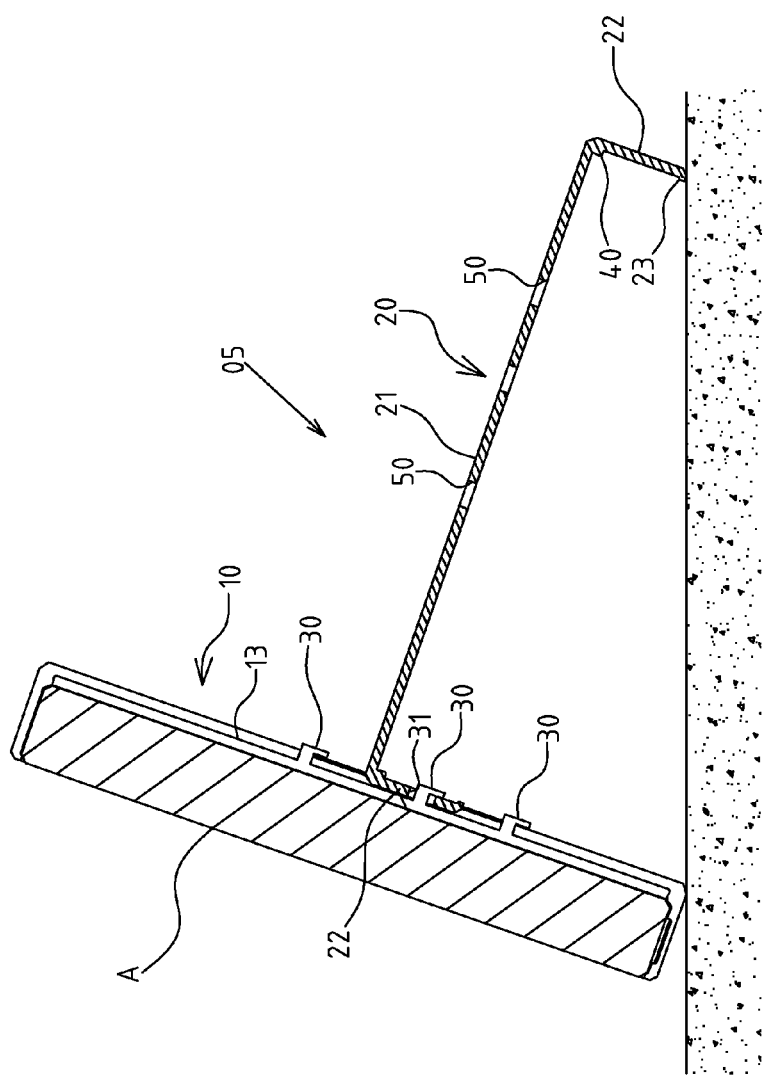
FIG. 8 is a sectional view showing the operating state of the present invention.

The embodiments and operating status of the present invention are described below:

Referring to FIGS. 6-8, at least a snap lock 30 (three snap locks 30 are set in the present invention) is arranged at a preset location on the recess plate portion 13 of the main body 10. At least a lateral face 22 of the secondary body 20 is provided with a slot 31 of predefined pattern. In the embodiment of the present invention, the snap lock 30 is designed into a downward hooked pattern, so that the user could firstly align the slot 31 with the snap lock 30, and then fix the slot 31 into the snap lock 30 by pulling upwards, or the snap lock 30 is designed into an upward hooked pattern. In such a case, the slot 31 is fixed into the snap lock 30 by pulling downwards, and one lateral face 22 of the secondary body 20 could be fixed onto the recess plate portion 13, and the other lateral face 22 is used as a support (referring to FIG. 8, the secondary body 20 is used as a support) to keep the main body 10 at a special angle. So, the user could directly place the electronic device A onto the table surface, without need of holding it manually. Besides, where necessary, the slot 31 is engaged onto different snap locks 30, enabling to visualize the electronic device A at an optimal angle. Of which, perforated holes 50 are set on the top surface 21 of the secondary body 20 correspondingly to the snap locks 30. When the secondary body 20 is assembled onto the main body 10, the perforated holes 50 could be penetrated by the snap locks 30.

Figure 3:
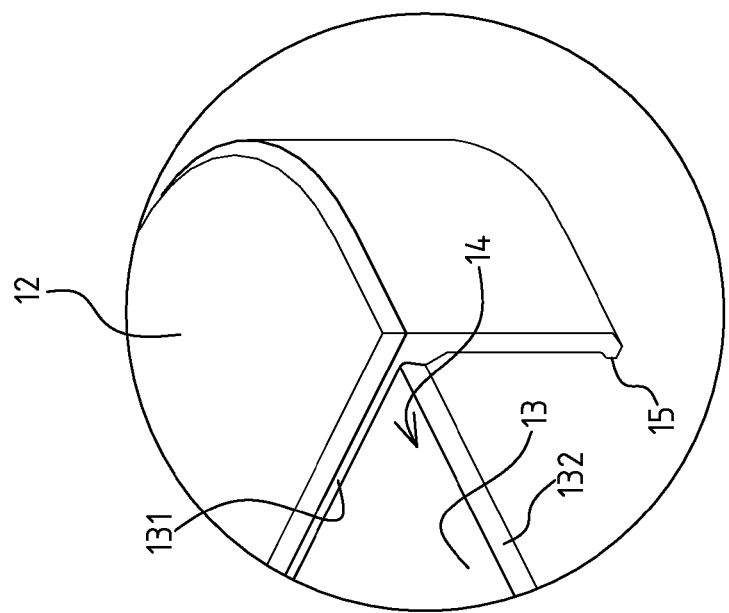
FIG. 3 is a partially enlarged view of the main body of the present invention.
Figure 5:
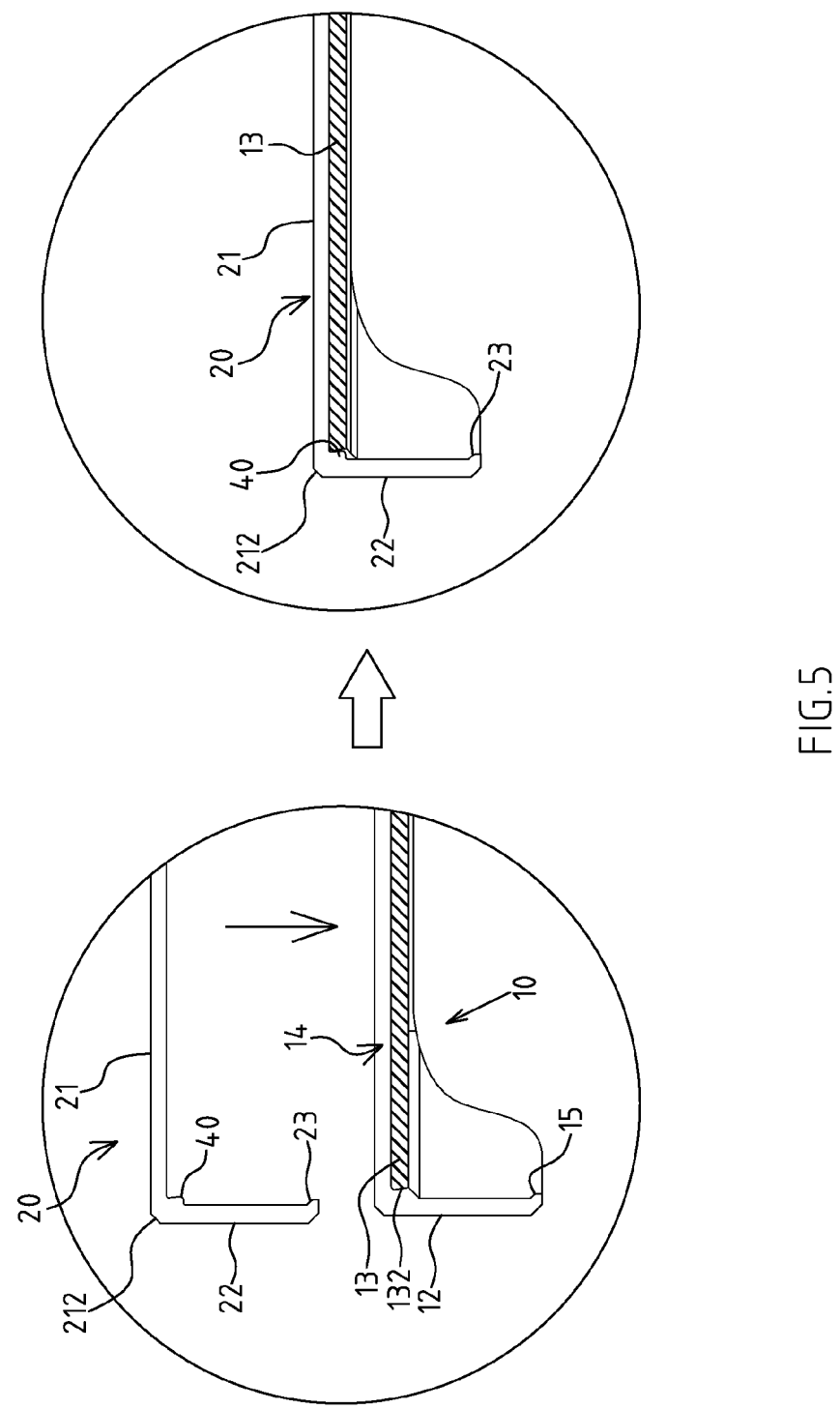
FIG. 5 is a partially enlarged view showing the assembly state of the main and secondary bodies of the present invention.

Referring also to FIGS. 3 and 5, a stop flange 40 is formed at the joint of the top surface 21 and the lateral face 22, so when the secondary body 20 is mounted into the holding; space 14 of the main body 10, the stop flange 40 is abutted securely onto the open side 132 of the recess plate portion 13 on the main body 20, so that the main and secondary bodies 10, 20 are assembled more robustly.

The present invention mainly lies in a removable structure of the main and secondary bodies 10, 20. When the user intends to remove the protective housing assembly 05, only the main body 10 or the secondary body 20 is required to be pulled so that the first limiting flange 15 or second limiting flange 23 is disengaged from the electronic device A. Moreover, the main and secondary bodies 10, 20 could also be removed easily, thus resolving the shortcomings of conventional protective housings. Furthermore, the main and secondary bodies 10, 20 of the present invention could be configured with different colors or patterns, so the youth could select freely preferred colors and patterns while disassembling or replacing the main body 10 or secondary body 20 easily. Finally, the disassembled main body 10 or secondary body 20 could be repetitively used or combined, thereby improving substantially the convenience and applicability of the electronic device A while avoiding its damage.

I claim:

1. A protective housing assembly suitable for attachment onto a back of an existing electronic device, the protective housing assembly comprising:
  a main body comprising:
    a front frame body;
    a rear frame body positioned at a side of said front frame body, said front frame body and said rear frame body suitable for covering sides and corners of the back of the electronic device;
    a recess plate portion extending transversely between said front frame body and said rear frame body, said front frame body and said rear frame body being recessed to form a holding space, a pair of limited sides formed at a juncture of said front frame body and said rear frame body and said recess plate portion, said recess plate portion having pair of open sides formed at left and right sides thereof; and
  a first limiting flange formed interiorly and at a bottom of said front frame body and said rear frame body, said first limiting flange suitable for receiving corners and sides of the electronic device;
  a secondary body removably positioned into said holding space of said main body, said secondary body comprising:

a top surface having longitudinal sides and lateral sides, said top surface being matable with said recess plate portion of said main body;

a pair of lateral faces extending downwardly from said lateral sides of said top surface, said pair of lateral faces being aligned with said pair of open sides of said recess plate portion when said secondary body is mounted into said holding space of said main body, said longitudinal sides of said top surface being aligned with said limited sides of said recess of plate portion;

a second limiting flange formed interiorly at a bottom of said pair of lateral faces of said secondary body, said second limiting flange suitable for fixing two sides of the electronic device when said secondary body is mounted into said holding space of said main body; and a snap lock positioned on said recess plate portion of said main body, at least one of said pair of lateral faces of said secondary body having a slot therein, said slot alignable with said snap lock, said slot fixed onto said snap lock by pulling upwardly or pressing downwardly such that the lateral face is securely fixed onto said secondary body, said secondary body having a perforated hole corresponding to said snap lock such that said snap lock penetrates said perforated hole when said secondary body is assembled onto said main body.

2. The protective housing assembly of claim 1, further comprising:

a stop flange formed at a joint of said top surface and the lateral face, said stop flange abutting securely onto said open side or said recess plate portion when said secondary body is mounted into said holding space.

3. The protective housing assembly of claim 1, the electronic device being a mobile phone.

4. The protective housing assembly of claim 1, the electronic device being a portable multi-media player.

5. The protective housing assembly of claim 1, the electronic device being a tablet computer.

6. The protective housing assembly of claim 1, said main body and said secondary body being formed of a metallic material.

7. The protective housing assembly of claim 1, said main body and said secondary body being formed of a polymeric material.

8. The protective housing assembly of claim 1, one of said main body and said secondary body being of a metallic material, the other of said main body and said secondary body being of a polymeric material.

\* \* \* \* \*